United States Patent
Corboliou et al.

(10) Patent No.: US 12,246,596 B2
(45) Date of Patent: Mar. 11, 2025

(54) METHOD FOR PROJECTING LIGHT IN THE INTERIOR OF A VEHICLE, AUTOMOTIVE LIGHT PROJECTOR AND AUTOMOTIVE LIGHT ASSEMBLY

(71) Applicant: VALEO VISION, Bobigny (FR)

(72) Inventors: Vincent Corboliou, Bobigny (FR); Frederic Gossele, Bobigny (FR)

(73) Assignee: Valeo Vision, Bobigny (FR)

( * ) Notice: Subject to any disclaimer, the term of this patent is extended or adjusted under 35 U.S.C. 154(b) by 154 days.

(21) Appl. No.: 17/799,849

(22) PCT Filed: Feb. 11, 2021

(86) PCT No.: PCT/EP2021/053323
§ 371 (c)(1),
(2) Date: Aug. 15, 2022

(87) PCT Pub. No.: WO2021/165133
PCT Pub. Date: Aug. 26, 2021

(65) Prior Publication Data
US 2023/0073355 A1    Mar. 9, 2023

(30) Foreign Application Priority Data
Feb. 19, 2020  (FR) .................................. 2001632

(51) Int. Cl.
*B60K 35/00*    (2024.01)
*B60K 35/60*    (2024.01)
(Continued)

(52) U.S. Cl.
CPC ................ *B60K 35/00* (2013.01); *B60Q 3/12* (2017.02); *B60K 35/60* (2024.01); *B60K 35/85* (2024.01);
(Continued)

(58) Field of Classification Search
CPC ........ B60K 35/00; B60K 35/60; B60K 35/85; B60K 2360/21; B60K 2360/334;
(Continued)

(56) References Cited

U.S. PATENT DOCUMENTS 9,758,093 B2 *  9/2017  Backes .................... B60Q 3/00
12,012,043 B2 *  6/2024  Buerkle ................. B60R 1/088
(Continued)

FOREIGN PATENT DOCUMENTS

CN          107444283 A      12/2017
DE       102008055187 A1      3/2010
(Continued)

OTHER PUBLICATIONS

European Patent Office, International Search Report and Written Opinion of corresponding International Patent Application No. PCT/EP2021/053323, dated Apr. 16, 2021.
(Continued)

*Primary Examiner* — Atul Trivedi
(74) *Attorney, Agent, or Firm* — Valeo Vision

(57) ABSTRACT

The invention provides device, system, and method for projecting light in the interior of an automotive vehicle. The method includes sending data to the light projector regarding the lighting conditions in the interior of the automotive vehicle, using the data to modify some projection parameter of a light pattern, and projecting the light pattern.

12 Claims, 3 Drawing Sheets

(51) Int. Cl.
 *B60K 35/85* (2024.01)
 *B60Q 3/12* (2017.01)
(52) U.S. Cl.
 CPC .... *B60K 2360/21* (2024.01); *B60K 2360/334* (2024.01); *B60K 2360/349* (2024.01); *B60K 2360/586* (2024.01); *B60K 2360/589* (2024.01); *B60K 2360/771* (2024.01)
(58) Field of Classification Search
 CPC ........ B60K 2360/349; B60K 2360/586; B60K 2360/589; B60K 2360/771; B60Q 3/12
 USPC ............................................................ 701/36
 See application file for complete search history.

(56) References Cited

U.S. PATENT DOCUMENTS

| | | | | |
|---|---|---|---|---|
| 12,013,110 | B2* | 6/2024 | Butcher | B63B 45/02 |
| 12,025,798 | B1* | 7/2024 | Dehkordi | G02B 27/0101 |
| 2008/0137355 | A1* | 6/2008 | Offermann | F21V 5/002 |
| | | | | 362/488 |
| 2009/0268164 | A1 | 10/2009 | Bowden et al. | |
| 2013/0097557 | A1 | 4/2013 | Madau et al. | |
| 2013/0335712 | A1* | 12/2013 | Lanchava | G03B 29/00 |
| | | | | 353/52 |
| 2015/0224924 | A1* | 8/2015 | Backes | B60Q 3/00 |
| | | | | 701/36 |
| 2016/0124225 | A1 | 5/2016 | Kwak | |
| 2017/0064221 | A1* | 3/2017 | Taylor | H04N 25/131 |
| 2017/0162168 | A1* | 6/2017 | Lopez | G09G 5/026 |
| 2017/0206831 | A1* | 7/2017 | Schmittat | G06F 3/017 |
| 2018/0086259 | A1* | 3/2018 | Bel | H05B 47/105 |
| 2018/0086260 | A1* | 3/2018 | Barillot | G03B 21/20 |
| 2018/0096668 | A1* | 4/2018 | Surnilla | B60K 35/00 |
| 2018/0170254 | A1* | 6/2018 | Mioc | B60K 35/60 |
| 2018/0218611 | A1* | 8/2018 | Nagura | B60Q 9/00 |
| 2018/0247585 | A1* | 8/2018 | Kanayama | H01L 25/0753 |
| 2018/0252035 | A1* | 9/2018 | Casey | E06B 9/68 |
| 2018/0297470 | A1* | 10/2018 | Kim | G08G 1/166 |
| 2018/0334099 | A1* | 11/2018 | Gao | G06F 3/147 |
| 2019/0384232 | A1* | 12/2019 | Casey | G06V 10/60 |
| 2020/0164807 | A1* | 5/2020 | Hilldore | B60R 1/08 |
| 2020/0207261 | A1* | 7/2020 | Camras | B60Q 1/245 |
| 2020/0207264 | A1* | 7/2020 | Camras | H05B 47/11 |
| 2020/0271823 | A1* | 8/2020 | Herman | G01S 7/497 |
| 2020/0290513 | A1* | 9/2020 | Karafin | G06F 3/017 |
| 2021/0096225 | A1* | 4/2021 | Subasingha | G01S 17/10 |
| 2021/0229672 | A1* | 7/2021 | Herman | G06T 3/4015 |
| 2022/0041105 | A1* | 2/2022 | Jochmann | B60R 11/04 |
| 2022/0170320 | A1* | 6/2022 | Casey | G06T 7/0002 |
| 2022/0170321 | A1* | 6/2022 | Casey | H05B 47/105 |
| 2022/0374641 | A1* | 11/2022 | Hassani | G06V 10/30 |
| 2023/0043536 | A1* | 2/2023 | Herman | G06T 5/70 |
| 2023/0073355 | A1* | 3/2023 | Corboliou | B60K 35/50 |
| 2024/0191858 | A1* | 6/2024 | Kim | F21S 43/19 |
| 2024/0191859 | A1* | 6/2024 | Kim | F21S 43/19 |
| 2024/0198900 | A1* | 6/2024 | Hupfer | B60Q 9/00 |
| 2024/0311616 | A1* | 9/2024 | Donderici | G07C 5/0808 |

FOREIGN PATENT DOCUMENTS

| | | | | |
|---|---|---|---|---|
| DE | 102016005062 | A1 * | 11/2017 | ............ B60Q 3/20 |
| DE | 102016005255 | A1 * | 11/2017 | ............ B60K 35/00 |
| DE | 102016006703 | A1 * | 12/2017 | ............ B60Q 3/43 |
| DE | 102018217125 | B3 | 9/2019 | |
| DE | 102021109954 | A1 * | 10/2022 | ............ B60Q 3/80 |
| EP | 3184363 | A1 * | 6/2017 | ............ B60Q 3/217 |
| EP | 3222467 | A1 * | 9/2017 | ............ B60K 35/00 |
| EP | 3231667 | A1 * | 10/2017 | ............ B60Q 3/80 |
| EP | 3388286 | A1 * | 10/2018 | ............ B60K 35/00 |
| EP | 3680883 | A1 * | 7/2020 | ............ B60K 35/00 |
| EP | 2965946 | B1 * | 1/2023 | ............ B60Q 1/04 |
| EP | 4234331 | A1 * | 8/2023 | ............ B60K 35/00 |
| FR | 3047942 | A1 * | 8/2017 | ............ B60K 35/00 |
| FR | 3052145 | A1 * | 12/2017 | ............ B60Q 3/43 |
| FR | 3056495 | A1 | 3/2018 | |
| FR | 3107222 | A1 * | 8/2021 | ............ B60K 35/00 |
| JP | 2013082445 | A | 5/2013 | |
| JP | 2016132407 | A * | 7/2016 | ............ B60Q 1/06 |
| KR | 20220045908 | A * | 4/2022 | ........... B60Q 1/0047 |
| WO | WO-2012102959 | A1 * | 8/2012 | ............ B60K 37/02 |
| WO | WO-2020018470 | A1 * | 1/2020 | ............ B60K 35/00 |
| WO | WO-2022251990 | A1 * | 12/2022 | ............ B60Q 3/18 |

OTHER PUBLICATIONS

China National Intellectual Property Administration, Office Action (with English translation) of corresponding Chinese Patent Application No. 202180009418.7, dated Dec. 21, 2024.

* cited by examiner

[Fig. 1]
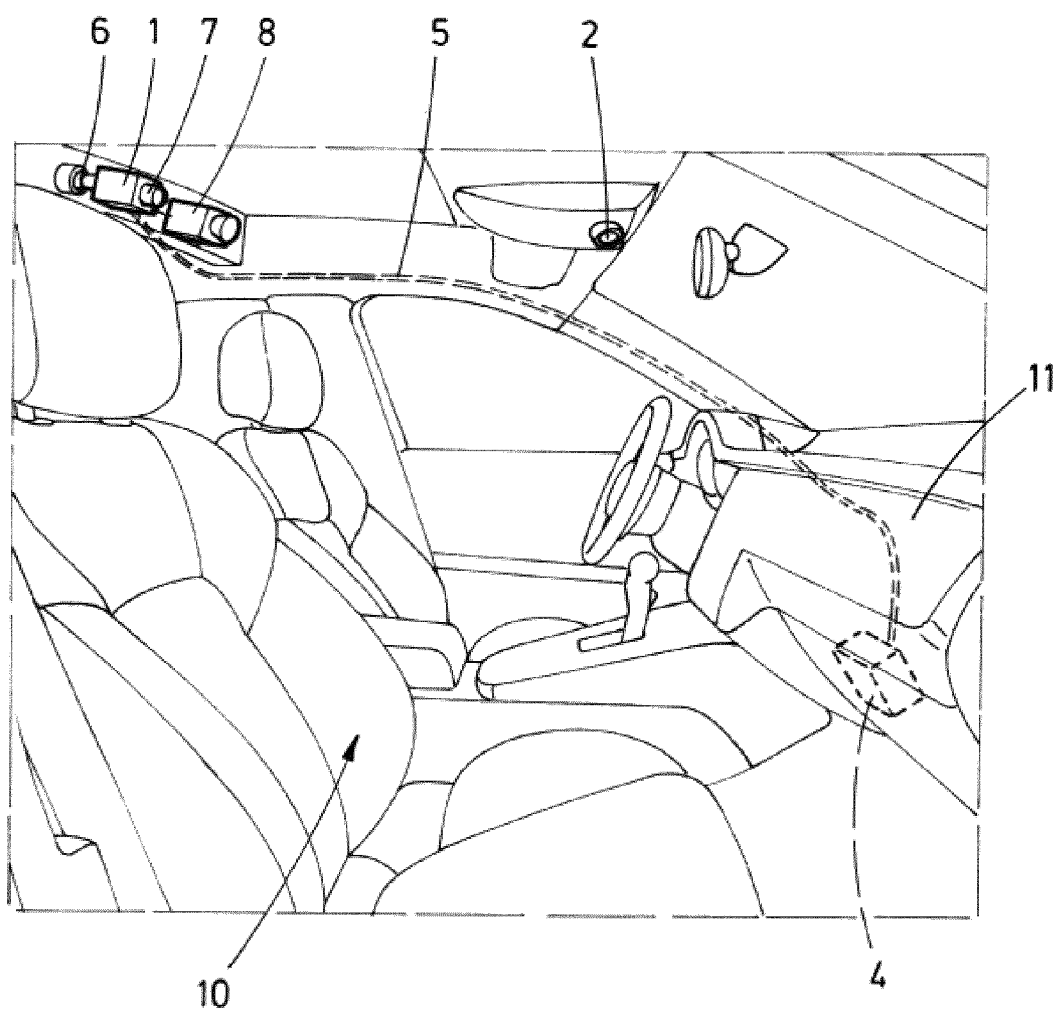

[Fig. 2]
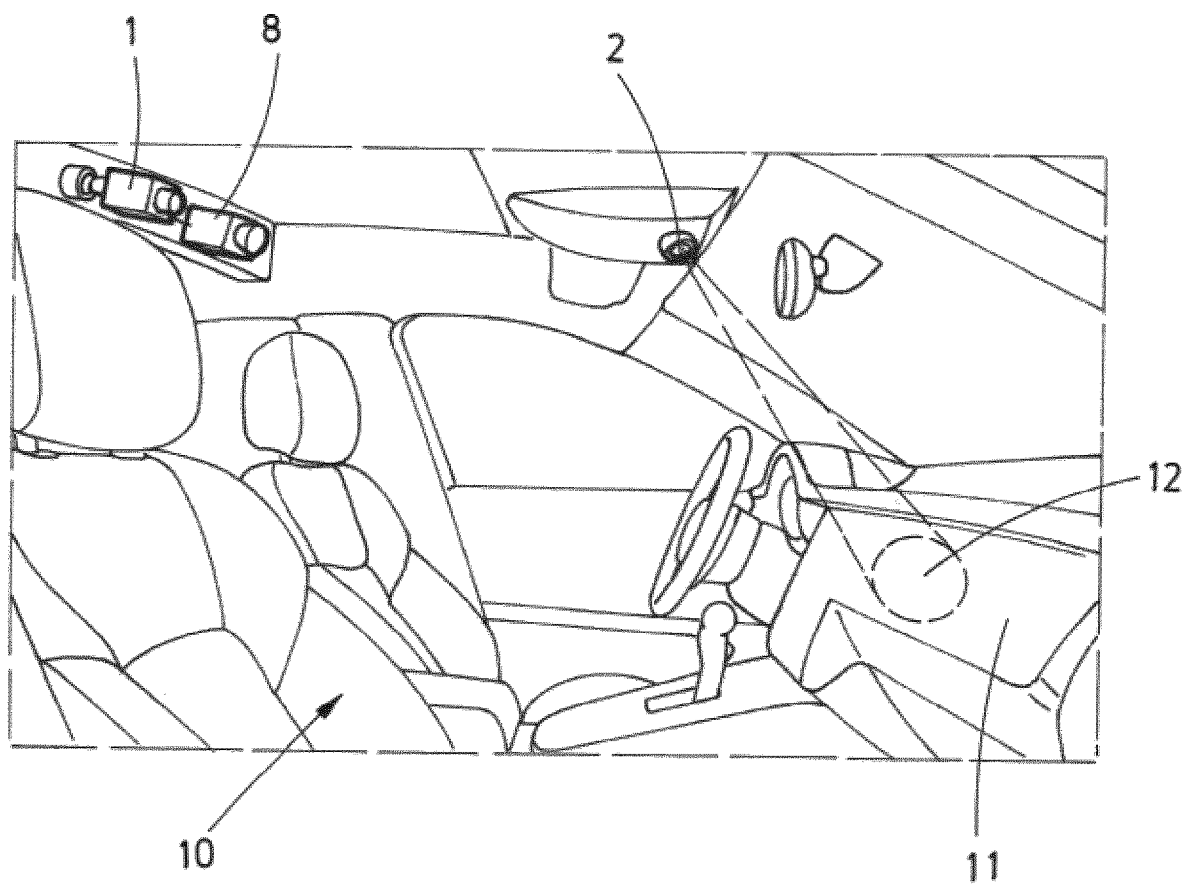

[Fig. 3]
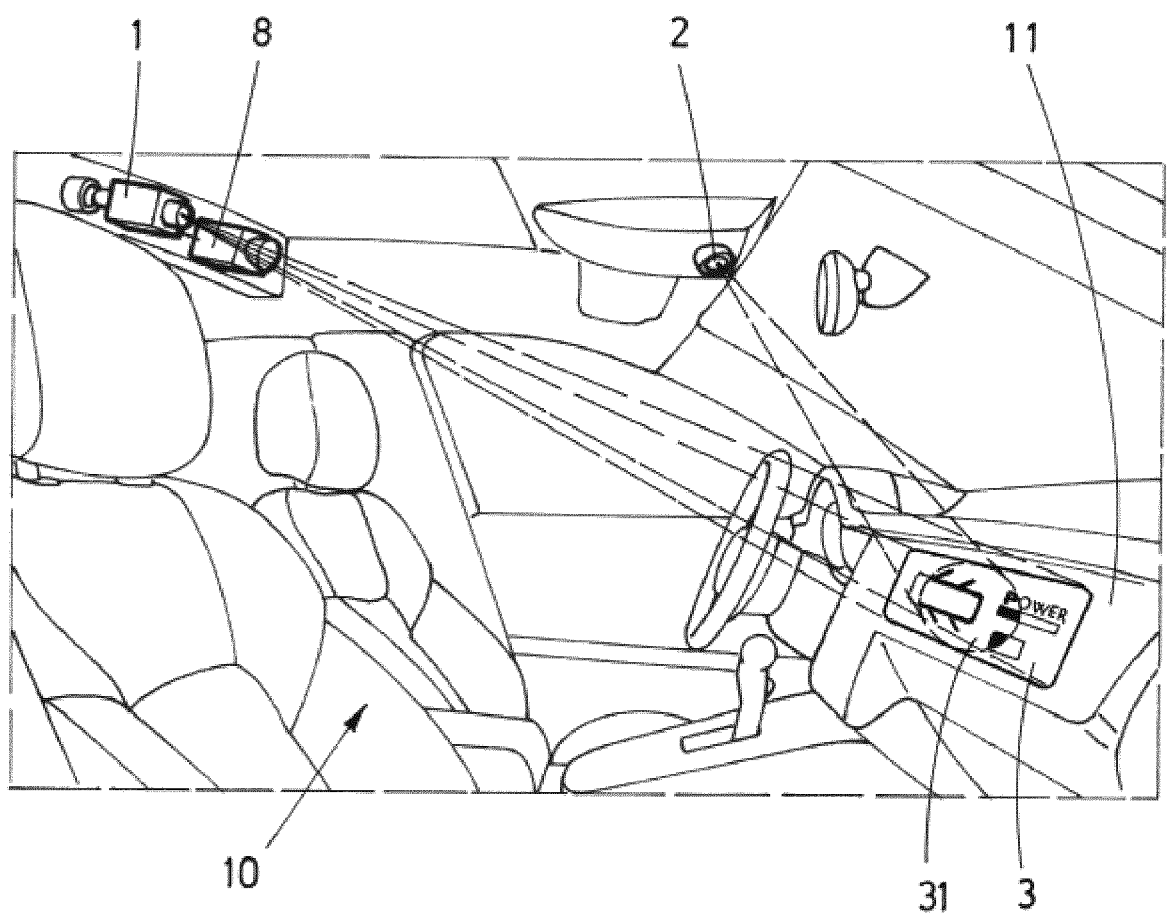

METHOD FOR PROJECTING LIGHT IN THE INTERIOR OF A VEHICLE, AUTOMOTIVE LIGHT PROJECTOR AND AUTOMOTIVE LIGHT ASSEMBLY

CROSS-REFERENCE TO RELATED APPLICATIONS

This application is filed under 35 U.S.C. § 371 U.S. National Phase of International Application No. PCT/EP2021/053323 filed Feb. 11, 2021 (published as WO2021165133), which claims priority benefit to French Application No. 2001632 filed on Feb. 19, 2020, the disclosures of which are herein incorporated by reference in their entirety.

TECHNICAL FIELD

This invention is related to the field of the vehicle lighting devices intended to project light inside the vehicle.

BACKGROUND OF THE INVENTION

Current automotive vehicles provide new functionalities to the passengers on board, from information to entertainment systems. Some of these functionalities may be provided by an internal light projector, but the incorporation of such a device inside the vehicle may not be immediate.

BRIEF SUMMARY OF THE INVENTION

The invention provides a solution for these problems by means of a method for projecting light in the interior of an automotive vehicle, the method comprising the steps of
  providing a light projector in the interior of an automotive vehicle;
  sending data to the light projector regarding the lighting conditions in the interior of the automotive vehicle;
  using the data to modify some projection parameter of a light pattern; and
  project the light pattern.

This method allows the use of a light projector in the interior of an automotive vehicle which is able to compensate the effect of some additional light that may be further provided by some elements of the vehicle itself or by any other light source that may reach the interior of said vehicle.

In some particular embodiments, the projection parameter is at least one of maximum luminous intensity, average luminous intensity, minimum luminous intensity or shape of the light pattern.

By modifying one of these parameters, the resulting projected light pattern is adapted to the additional lighting provided by any light source reaching the interior of the vehicle, so that the resulting projected light pattern has the correct shape and intensity distribution to be visible even despite the luminous interference of these light sources.

In some particular embodiments, the data is sent to the light projector by a vehicle control unit via a CAN bus.

This CAN (Controlled Area Network) bus is suitable for being used in automotive vehicles, to provide a good communication between control units.

In some particular embodiments, the method further comprises the steps of
  before the step of sending data to the light projector, the method comprises a step of sensing an ambient light;
  the data sent to the light projector comprises ambient data related to the ambient light.

This way, the method may be also applied to the luminous interference caused by ambient light. The resulting projected light pattern may be adapted both to internal and external luminous interferences.

In some particular embodiments, the method further comprises the steps of
  before the step of sending data to the light projector, the method comprises a step of obtaining light data regarding the operation of an auxiliary lighting element comprised in the vehicle;
  the data sent to the light projector comprises data related to the operation of the auxiliary lighting element.

This way, the method may be also applied to the luminous interference caused by an internal auxiliary light of the vehicle.

In some particular embodiments, the method further comprises the step of checking the availability of new data by a projector control unit.

Thus, the light projector may be always ready to modify the light pattern due to the information received from the external devices.

In some particular embodiments, the light pattern comprises light pixels, and the step of modifying the projection parameter affects to the luminous intensity of at least one of the pixels.

A light pixel arrangement allows the light projector to provide an accurate adjustment.

In a second inventive aspect, the invention provides an automotive light projector comprising a plurality of light sources and a projector control unit configured to carry out the steps of a method according to the first inventive aspect.

This automotive light projector is able to adapt to the luminous interferences caused by the internal lighting elements of the vehicle.

In some particular embodiments, the light sources are solid-state light sources arranged in a matrix arrangement.

The term "solid state" refers to light emitted by solid-state electroluminescence, which uses semiconductors to convert electricity into light. Compared to incandescent lighting, solid state lighting creates visible light with reduced heat generation and less energy dissipation. The typically small mass of a solid-state electronic lighting device provides for greater resistance to shock and vibration compared to brittle glass tubes/bulbs and long, thin filament wires. They also eliminate filament evaporation, potentially increasing the lifespan of the illumination device. Some examples of these types of lighting comprise semiconductor light-emitting diodes (LEDs), organic light-emitting diodes (OLED), or polymer light-emitting diodes (PLED) as sources of illumination rather than electrical filaments, plasma or gas.

In a third inventive aspect, the invention provides an automotive projection assembly comprising
  an automotive light projector according to the previous inventive aspect;
  a vehicle control unit; and
  a communication element configured to transfer data between the vehicle control unit and the light projector.

In some particular embodiments, the communication element is a CAN bus.

In some particular embodiments, the automotive projection assembly further comprises a camera configured to sense ambient luminous intensity and send ambient data to the light projector.

In some particular embodiments, the automotive projection assembly further comprises a communication port, configured to send and/or receive information via a communication protocol, such as WPAN, WLAN, WMAN or WWAN.

Such a communication port, which may be comprised in the light projector or outside it (e.g., associated to the communication port of the vehicle), is suitable for providing new data about the elements to be used in a method according to the invention, or to update or provide any other information which may be useful to perform such a method.

Unless otherwise defined, all terms (including technical and scientific terms) used herein are to be interpreted as is customary in the art. It will be further understood that terms in common usage should also be interpreted as is customary in the relevant art and not in an idealized or overly formal sense unless expressly so defined herein.

In this text, the term "comprises" and its derivations (such as "comprising", etc.) should not be understood in an excluding sense, that is, these terms should not be interpreted as excluding the possibility that what is described and defined may include further elements, steps, etc.

BRIEF DESCRIPTION OF THE DRAWINGS

To complete the description and in order to provide for a better understanding of the invention, a set of drawings is provided. Said drawings form an integral part of the description and illustrate an embodiment of the invention, which should not be interpreted as restricting the scope of the invention, but just as an example of how the invention can be carried out. The drawings comprise the following figures:

FIG. 1 shows an automotive vehicle which comprises an automotive projection assembly according to the invention.

FIG. 2 shows some steps of a method according to the invention.

FIG. 3 shows some further steps of a method according to the invention.

DETAILED DESCRIPTION OF THE INVENTION

Elements of the example embodiments are consistently denoted by the same reference numerals throughout the drawings and detailed description where appropriate:

1 Light projector
2 Auxiliary internal lights
3 Custom light pattern
31 Zone of the custom light pattern
4 Vehicle control unit
5 CAN bus
6 Projector control unit
7 LEDs
8 Camera
10 Automotive vehicle
11 Dashboard
12 Zone of the dashboard The example embodiments are described in sufficient detail to enable those of ordinary skill in the art to embody and implement the systems and processes herein described. It is important to understand that embodiments can be provided in many alternate forms and should not be construed as limited to the examples set forth herein.

Accordingly, while embodiment can be modified in various ways and take on various alternative forms, specific embodiments thereof are shown in the drawings and described in detail below as examples. There is no intent to limit the particular forms disclosed. On the contrary, all modifications, equivalents, and alternatives falling within the scope of the appended claims should be included. Elements of the example embodiments are consistently denoted by the same reference numerals throughout the drawings and detailed description where appropriate.

FIG. 1 shows an automotive vehicle 10 which comprises an automotive projection assembly according to the invention.

This automotive projection assembly comprises an automotive light projector 1, a vehicle control unit 4 and a CAN bus 5 configured to transfer data between the vehicle control unit 4 and the light projector 1. This assembly further comprises a camera 8 configured to sense ambient luminous intensity and send ambient data to the light projector 1.

The light projector 1 comprises a plurality of LEDs 7 and a projector control unit 6. The projector control unit 6 receives the data via the CAN bus 5.

The automotive vehicle 10 further comprises auxiliary internal lights 2 which are configured to emit light towards a zone of the dashboard 11. These internal lights 2 may be turned on or turned off depending on the users' needs. The state of these internal lights 2 is recorded by the vehicle control unit 4.

FIG. 2 shows a scenario where a method according to the invention takes place.

An internal light 2 is turned on, and some of the light of this internal light is projected over the dashboard 11 of the automotive vehicle, creating a zone 12 where the luminous intensity is different from the rest of the dashboard.

The state of this internal light is recorded by the vehicle control unit, so that, when the light projector is requested to provide a light pattern, the vehicle control unit sends the information about the operation of the internal light, so that the projector control unit uses this information to create a custom light pattern.

FIG. 3 shows this custom light pattern 3, where a particular zone 31 of this light pattern 3 has a higher luminous intensity, to compensate the effect of the internal light, which is illuminating the zone of the dashboard where the zone 31 of the light pattern 3 is going to be projected.

As a consequence, the resulting projected light pattern will be visible by the users with the same intensity, despite the luminous interference of the internal light of the vehicle.

FIG. 1 also showed a camera 8 which was present in the automotive projection assembly. This camera 8 is used for sensing the ambient light in the dashboard. After gathering these data, they are sent to the projector control unit, so that these ambient data are taken into account when defining the luminous intensity of the pixels of the light pattern to be projected.

In any case, the system is connected by a communication port with the manufacturer server via a communication protocol, such as GPRS, to send and receive updating about new features to be included in the method.

What is claimed is:

1. A method for projecting light in a cabin interior of an automotive vehicle, the method comprising:
providing a light projector in the cabin interior of the automotive vehicle, the light projector configured to adapt to luminous interferences caused by internal lighting elements of the automotive vehicle;
sending data to the light projector regarding the lighting conditions in the cabin interior of the automotive vehicle;
using the data to modify a projection parameter of a light pattern, wherein the projection parameter is at least one of a maximum luminous intensity, an average luminous intensity, a minimum luminous intensity; and projecting the light pattern, wherein the light pattern includes light pixels such that a modification of the projection parameter affects a luminous intensity of at least one of the light pixels.

2. The method of claim 1, wherein the projection parameter further includes a shape of the light pattern.

3. The method of claim 1, wherein the data is sent to the light projector by a vehicle control unit via a Controlled Area Network (CAN) bus.

4. The method of claim 1, further including sensing an ambient light, with the data and information related to the ambient light.

5. The method of claim 1, further including obtaining light data regarding an operation of an auxiliary lighting element included in the vehicle, with the data including information related to the operation of the auxiliary lighting element.

6. The method of claim 1, further including checking an availability of new data by a projector control unit.

7. An automotive light projector comprising a plurality of light sources and a projector control unit configured to:
   receive a data regarding lighting conditions in a cabin interior of an automotive vehicle;
   adapt to luminous interferences caused by internal lighting elements of the automotive vehicle;
   use the data to modify a projection parameter of a light pattern, wherein the projection parameter is at least one of a maximum luminous intensity, an average luminous intensity, a minimum luminous intensity; and
   project the light pattern wherein the light pattern includes light pixels such that a modification of the projection parameter affects a luminous intensity of at least one of the light pixels.

8. The automotive light projector of claim 7, wherein the light sources are solid-state light sources arranged in a matrix arrangement.

9. An automotive projection assembly comprising:
   an automotive light projector configured to adapt to luminous interferences caused by internal cabin lighting elements of an automotive vehicle including
   a plurality of light sources and a projector control unit configured to:
      receive a data regarding lighting conditions in a cabin interior of an automotive vehicle;
      use the data to modify a projection parameter of a light pattern, wherein the projection parameter is at least one of a maximum luminous intensity, an average luminous intensity, a minimum luminous intensity; and
      project the light pattern, wherein the light pattern includes light pixels such that a modification of the projection parameter affects a luminous intensity of at least one of the light pixels;
   operate a vehicle control unit; and
   operate a communication element configured to transfer data between the vehicle control unit and the automotive light projector.

10. The automotive projection assembly of claim 9, wherein the communication element is a CAN bus.

11. The automotive projection assembly of claim 9, further including a camera configured to sense ambient luminous intensity and configured to send ambient data to the automotive light projector.

12. The automotive projection assembly of claim 9, further including a communication port that is configured to send or receive information via a communication protocol such as WPAN, WLAN, WMAN or WWAN.

* * * * *